(12) United States Patent
Singh

(10) Patent No.: US 11,363,555 B2
(45) Date of Patent: Jun. 14, 2022

(54) IMMEDIATE AUTHORIZATION FOR HIGH-POWER CUSTOMER PREMISES EQUIPMENT IN CITIZENS BROADBAND RADIO SERVICE SYSTEMS

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 66 days.

(21) Appl. No.: 17/061,843

(22) Filed: Oct. 2, 2020

(65) Prior Publication Data

US 2022/0110079 A1 Apr. 7, 2022

(51) Int. Cl.
| | |
|---|---|
| *H04L 12/58* | (2006.01) |
| *H04M 11/00* | (2006.01) |
| *H04W 4/00* | (2018.01) |
| *H04W 60/00* | (2009.01) |
| *H04W 12/08* | (2021.01) |
| *H04W 72/14* | (2009.01) |
| *H04W 16/14* | (2009.01) |

(52) U.S. Cl.
CPC ........... *H04W 60/00* (2013.01); *H04W 12/08* (2013.01); *H04W 16/14* (2013.01); *H04W 72/14* (2013.01)

(58) Field of Classification Search
CPC ..... H04W 60/00; H04W 12/08; H04W 16/14; H04W 72/14
USPC ....................................................... 455/411
See application file for complete search history.

(56) References Cited

U.S. PATENT DOCUMENTS

| | | | |
|---|---|---|---|
| 8,845,416 B2 | 9/2014 | Schwartz | |
| 2020/0236557 A1* | 7/2020 | Richardson | H04W 28/26 |
| 2020/0305159 A1* | 9/2020 | Raghothaman | H04W 72/082 |
| 2020/0351989 A1* | 11/2020 | Ahmet | H04W 12/08 |
| 2021/0022009 A1* | 1/2021 | De Sousa Chaves | H04W 76/25 |
| 2021/0058796 A1* | 2/2021 | Gandhi | H04W 48/08 |
| 2021/0084658 A1* | 3/2021 | Sheriff | H04W 28/16 |

(Continued)

OTHER PUBLICATIONS

Federal Communications Commission, 47 CFR Part 96 "Citizens Broadband Radio Service", Oct. 1, 2019 Edition (2019): 590-608.

(Continued)

*Primary Examiner* — Mark G. Pannell
(74) *Attorney, Agent, or Firm* — Mendelsohn Dunleavy. P.C.; Steve Mendelsohn

(57) ABSTRACT

In a Citizens Broadband Radio Service (CBRS) system, high-power customer premises equipment (HP-CPE) transmits a registration request to a spectrum access system (SAS), which determines a CPE device type for the HP-CPE and transmits a positive registration response to the HP-CPE. The HP-CPE transmits a grant request to the SAS, which transmits a positive grant response to the HP-CPE. The HP-CPE transmits a heartbeat request to the SAS, which relies on the CPE device type to approve the heartbeat request without relying on a corresponding Coordinated Periodic Activity among SASs (CPAS) process, and transmits a positive heartbeat response to the HP-CPE. In one method, the SAS determines the CPE device type using a database that maps FCC model numbers to device types. In another method, the registration request contains a field with the CPE device type. Both methods enable immediate HP-CPE authorization without the delay of a CPAS process.

12 Claims, 4 Drawing Sheets

(56) References Cited

U.S. PATENT DOCUMENTS

2021/0099886 A1* 4/2021 Taneja ............... H04L 5/0035
2021/0136666 A1* 5/2021 Srivastava ............ H04W 48/06
2021/0195429 A1* 6/2021 MacMullan ...... H04W 72/0453
2021/0234964 A1* 7/2021 Khawer ............... H04W 4/24
2021/0385662 A1* 12/2021 Furuichi ............... H04W 72/14

OTHER PUBLICATIONS

Wireless Innovation Forum, Spectrum Sharing Committee, "Signaling Protocols and Procedures for Citizens Broadband Radio Service (CBRS): Spectrum Access Systems (SAS)—Citizens Broadband Radio Service Device (CBSD) Interface Technical Specification." Document No. WINNF-TS-0016, version V1.2.5, May 18, 2018. pp. 1-52.

Wireless Innovation Forum, Spectrum Sharing Committee, "Requirements for Commercial Operation in the U.S. 3550-3700 MHz Citizens Broadband Radio Service Band." Document No. WINNF-TS-0112, version V1.9.1, Mar. 11, 2018: pp. 1-76.

Wireless Innovation Forum, Spectrum Sharing Committee, "CBRS Operational and Functional Requirements (Release 2)." Document No. WINNF-TS-1001, version V1.1.0, Apr. 2, 2020: pp. 1-17.

Wireless Innovation Forum, Spectrum Sharing Committee, "Signaling Protocols and Procedures for Citizens Broadband Radio Service (CBRS): Extensions to Spectrum Access System (SAS)—Citizens Broadband Radio Service Device (CBSD) Interface Technical Specification (Release 2)." Document No. WINNF-TS-3002, version V1.0.0, Mar. 5, 2020: pp. 1-40.

Wireless Innovation Forum, Spectrum Sharing Committee, "Signaling Protocols and Procedures for Citizens Broadband Radio Service (CBRS): Extensions to Spectrum Access System (SAS)—SAS Interface Technical Specification (Release 2)." Document No. WINNF-TS-3003, version V1.0.0, Apr. 2, 2020: pp. 1-19.

* cited by examiner

100

200

300

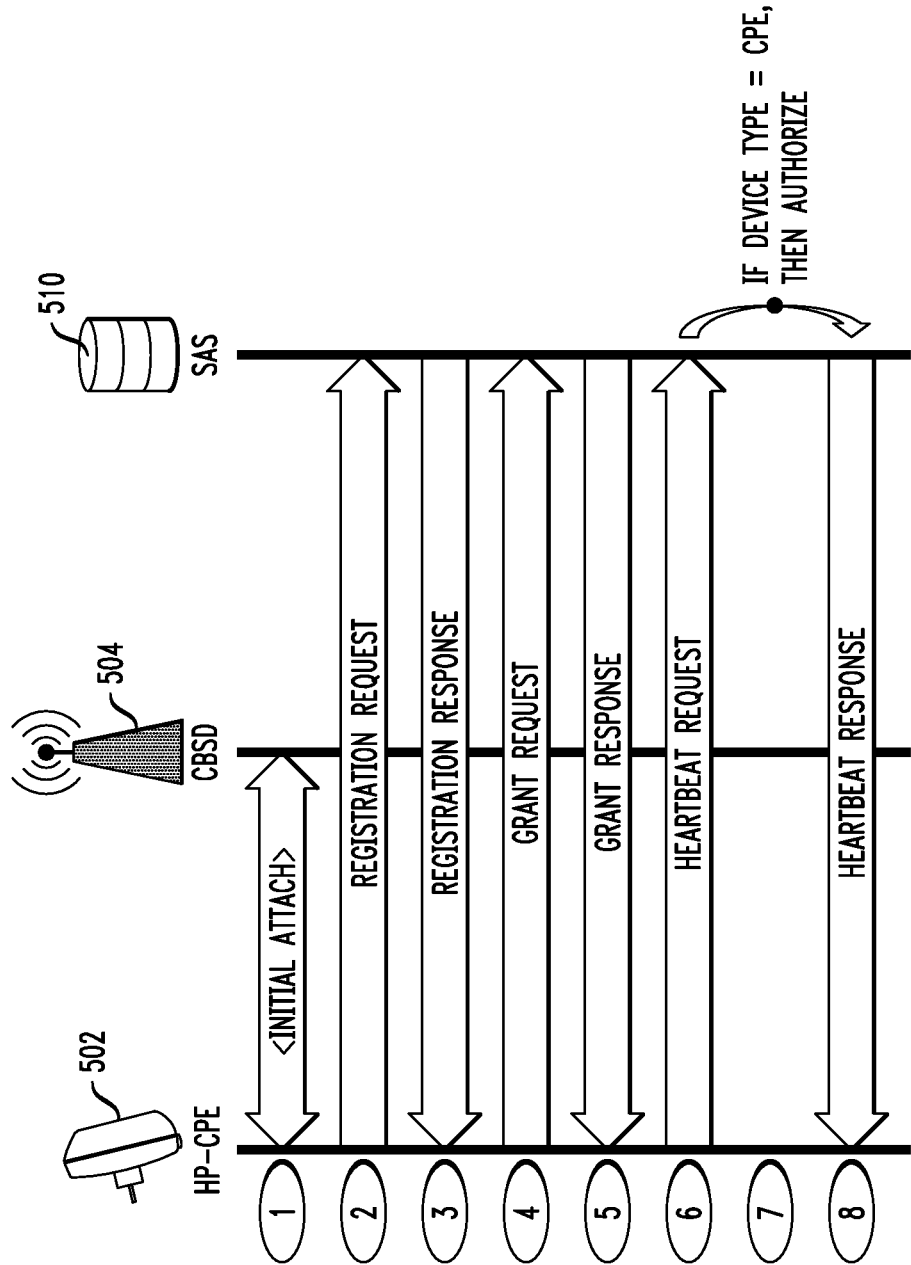

IMMEDIATE AUTHORIZATION FOR HIGH-POWER CUSTOMER PREMISES EQUIPMENT IN CITIZENS BROADBAND RADIO SERVICE SYSTEMS

BACKGROUND

Field of the Disclosure

The present disclosure relates to wireless communications systems and, more specifically, to wireless communications systems that conform to the Citizens Broadband Radio Service (CBRS) spectrum and, more specifically, to the unlicensed part called GAA (General Authorized Access).

Description of the Related Art

This section introduces aspects that may help facilitate a better understanding of the disclosure. Accordingly, the statements of this section are to be read in this light and are not to be understood as admissions about what is prior art or what is not prior art.

Citizens Broadband Radio Service (CBRS) is a 150-MHz wide broadcast band of the 3.5-GHz band that the U.S. Federal Communications Commission (FCC) has authorized for wireless service provider communication. The Spectrum Sharing Committee (SSC) of the Wireless Innovation Forum (WInnForum) serves as a common industry and government standards body supporting the development and advancement of CBRS spectrum-sharing technologies based on an architecture as defined under the FCC Part 96 rules, the teachings of which are incorporated herein by reference in their entirety.

FIG. 1 is a generalized representation of the network architecture of a conventional CBRS system 100, according to one possible implementation. As shown in FIG. 1, a fixed wireless access (FWA) customer premises equipment (CPE) 102 communicates wirelessly with a CBRS device (CBSD) 104 within an allocated subband of the CBRS band. The CBSD 104 is in turn connected to a Spectrum Access System (SAS) 110, in this example implementation, via a core network 106 and the Internet 108. The SAS 110 is responsible for allocating bandwidth to the CBSD 104 for use in communicating with the FWA CPE 102.

Although not explicitly represented in FIG. 1, the CBRS system 100 may have one or more additional CBSDs analogous to the CBSD 104, where each CBSD is connected to the SAS 110 and may communicate with one or more FWA CPEs analogous to the FWA CPE 102. Furthermore, in addition to or instead of one or more FWA CPEs, each CBSD may also communicate wirelessly with one or other types of wireless end-user devices, such as (without limitation) mobile phones.

Those skilled in the art will also understand that there may be multiple instances of CBRS systems analogous to the CBRS system 100 of FIG. 1, where the different SASs of those CBRS systems communicate with one another to perform a nightly Coordinated Periodic Activity among SASs (CPAS) process to coordinate the allocation of CBRS bandwidth to avoid interference between the various CBSDs and other high-power transmitters of those different CBRS systems.

The operation of a CBSD can be informatively described using two state machines: a CBSD Registration State Machine and a CBSD Grant State Machine. The CBSD Registration State Machine is responsible for identifying the presence of a CBSD at the SAS and determining whether the CBSD is unregistered or registered at the SAS. Each CBSD has one CBSD Registration State Machine. The CBSD Grant State Machine represents the state of a CBSD grant, i.e., Idle, Granted, or Authorized, where an authorized CBSD grant corresponds to the assignment to the CBSD of operational parameters (e.g., transmission power as represented by a maximum effective isotropic radiated power (EIRP) level) and a channel allocation (e.g., a particular subband within the CBSD band) for use by the CBSD in its wireless communications with its one or more associated wireless devices. A CBSD can have multiple grants, where each grant corresponds to a separate CBSD Grant State Machine.

FIG. 2 is a representation of the state diagram 200 for the CBSD Registration State Machine. A CBSD starts off in the Unregistered state 202. An unregistered CBSD can transmit a RegistrationRequest object to the associated SAS and, if the SAS approves the registration in a positive RegistrationResponse object transmitted back to the CBSD, then the CBSD transitions to the Registered state 204. If the SAS rejects the registration in a negative RegistrationResponse object transmitted back to the CBSD, then the CBSD remains in the Unregistered state 202. A CBSD in the Registered state 204 can transmit a DeregistrationRequest object to the SAS to deregister the CBSD, in which case the SAS responds by transmitting a DeregistrationResponse object back to the CBSD. Upon receiving the DeregistrationResponse from the SAS, the CBSD then transitions back to the Unregistered state 202, and all existing grants associated with the CBSD are terminated.

FIG. 3 is a representation of the state diagram 300 for the CBSD Grant State Machine. A CBSD in the Registered state 204 of FIG. 2 can request one or multiple grants from the associated SAS. For each grant, the corresponding Grant State Machine is in the Idle state 302 if the grant has not yet been approved by the SAS. A CBSD can transmit a GrantRequest object to the SAS. If the SAS denies the grant request, then the SAS transmits a negative GrantResponse object to the CBSD, and the CBSD remains in the Idle state 302. If the SAS approves the grant request, then the SAS transmits a positive GrantResponse object to the CBSD creating a new grant with specified operational parameters and a specified channel allocation. The reception of a positive GrantResponse object by the CBSD causes transition of the Grant State Machine to the Granted state 304. When the CBSD is ready to commence RF transmission under the grant, the CBSD starts to transmit periodic HeartbeatRequest objects associated with the grant to the SAS. If the CBSD has received multiple grants, then individual HeartbeatRequest objects are transmitted by the CBSD to the SAS for each grant, possibly aggregated in a single transmission to the SAS. If the SAS approves a heartbeat request for a grant, then the SAS transmits a positive HeartbeatResponse object to the associated CBSD, and the corresponding Grant State Machine transitions to the Authorized state 306. If the SAS fails to approve an initial heartbeat request for a grant, then the Grant State Machine remains in the Granted state 304. In the Authorized state 306, the CBSD is permitted to commence RF transmission and operate in the CBRS band using the operational parameters specific to that grant. The Grant State Machine transitions from the Authorized state 306 back to the Granted state 304, if the grant is suspended by the SAS or if the transmission right, as defined by a transmitExpireTime parameter in the HeartbeatResponse object, has expired. The Grant State Machine transitions back to the Idle state 302 if the associated grant is terminated by the SAS, relinquished by the CBSD, or expired as defined in a grantExpireTime parameter, or if the SAS-to-CBSD connectivity is lost.

According to the current CBRS standard, any wireless device that will transmit at a maximum EIRP level greater than a specified threshold (e.g., 23 dBm/10 MHz) must first be registered with the associated SAS and then be authorized by the SAS to transmit at that high power level. When a conventional SAS receives a request for such high-power transmission, the SAS will coordinate approval of that request with other SASs using the CPAS process. If, for example, the CPAS process is performed only once each night, then, when a CPE requests such high-power transmission, it may take up to 24 hours for that transmission to be approved. This delay can lead to undesirable inefficiencies in provisioning high-power (HP) CPEs in CBRS systems.

SUMMARY

Problems in the prior art are addressed in accordance with the principles of the present disclosure by providing methods to authorize HP-CPEs in CBRS systems without relying on corresponding CPAS processes.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 5 is a representation of a method for authorizing an HP-CPE in a CBRS system, according to a second embodiment.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

According to certain embodiments, in a CBRS system, a SAS is able to authorize an HP-CPE to transmit at a maximum EIRP level greater than the specified CBRS threshold level without relying on a corresponding CPAS process. For example, in situations in which the corresponding CBSD has already been authorized by the SAS via a previous CPAS process to transmit at that high EIRP level in a particular unlicensed subband of the CBRS band, the SAS can immediately authorize an HP-CPE associated with that CBSD to transmit up to that high EIRP level in that same CBRS subband without waiting for another CPAS process to be performed.

Figure 1:
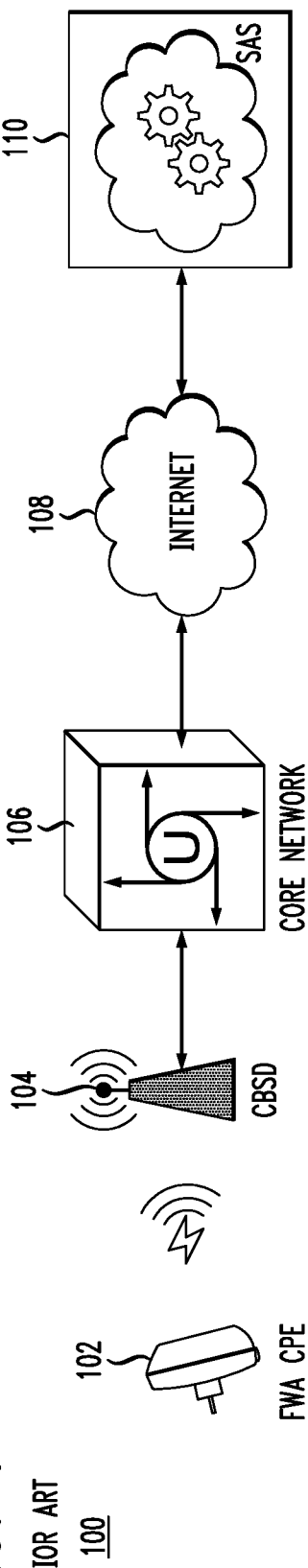
FIG. 1 is a generalized representation of the network architecture of a conventional CBRS system, according to one possible implementation.
Figure 2:
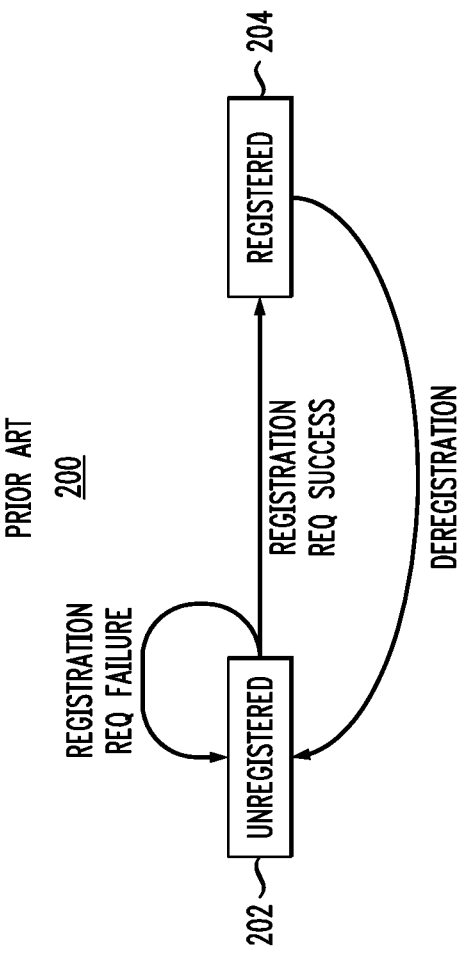
FIG. 2 is a representation of the state diagram for the CBSD Registration State Machine.
Figure 3:
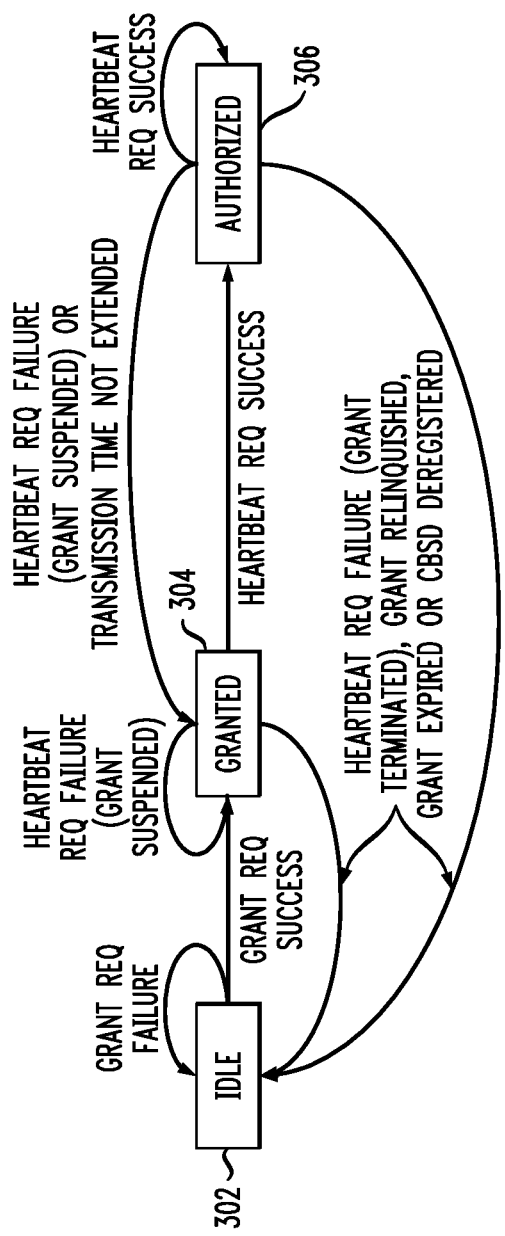
FIG. 3 is a representation of the state diagram for the CBSD Grant State Machine.
Figure 4:
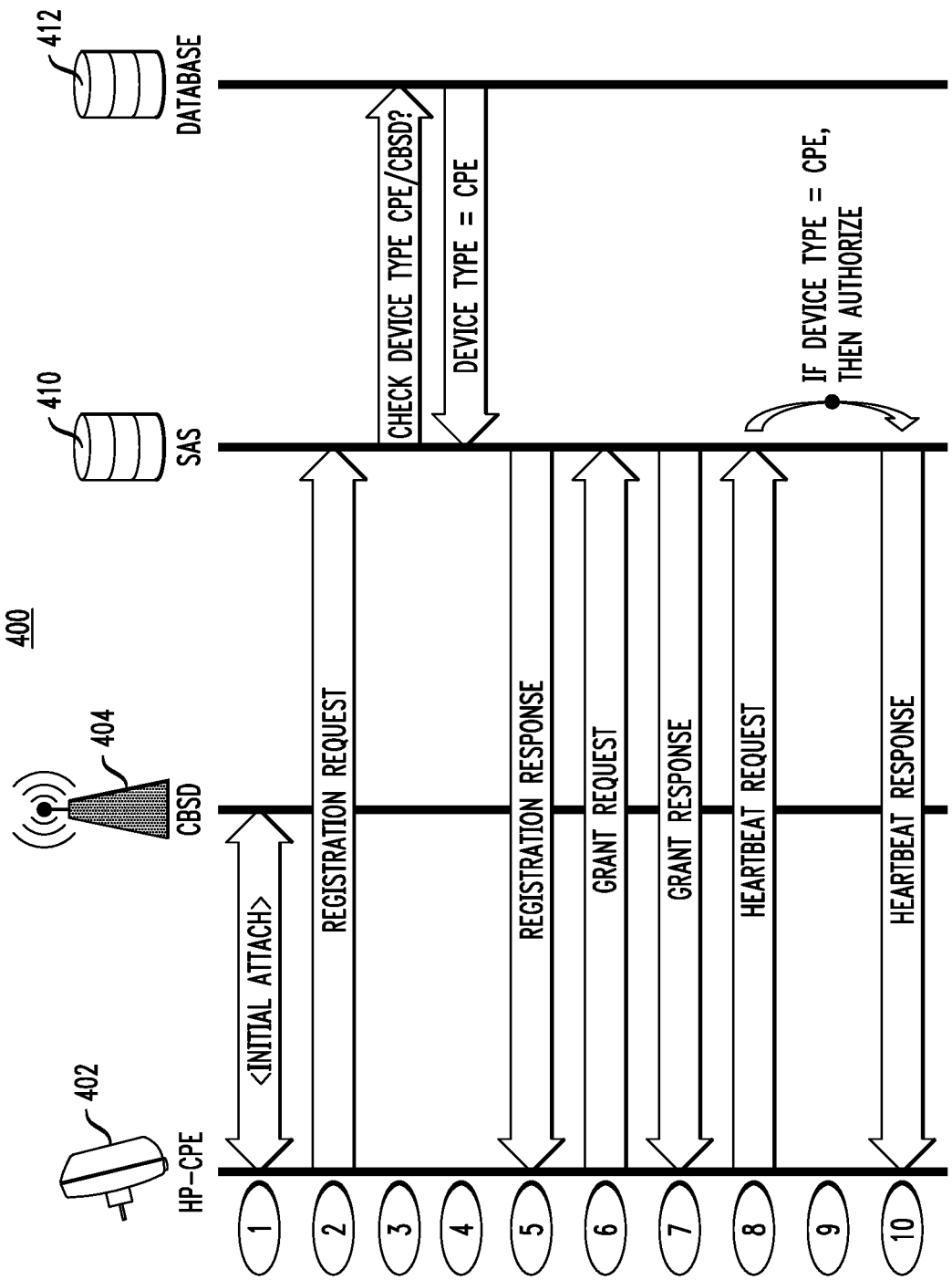
FIG. 4 is a representation of a method for authorizing an HP-CPE in a CBRS system, according to a first embodiment.

FIG. 4 is a representation of a method for authorizing an HP-CPE 402 in a CBRS system 400, according to a first embodiment. As shown in FIG. 4, the method is represented by the following ten steps.

In Step 1, the HP-CPE 402 attaches to the CBSD 404 using the existing network access procedures as defined for the technology deployed.

In Step 2, the HP-CPE 402 transmits a RegistrationRequest object to the SAS 410 via the CBSD 404. Among other information, the RegistrationRequest object contains the FCC model number and the unique device serial number for the HP-CPE 402.

In Step 3, the SAS 410 accesses a pre-defined database 412 that maps FCC model numbers to fields (e.g., one-bit flags) that identify whether wireless devices having particular FCC model numbers are, for example, CPEs or not CPEs (e.g., CBSDs). In this example, the wireless device seeking registration is the HP-CPE 402, which is a CPE. As such, when the SAS 410 queries the database 412 using the FCC model number for the HP-CPE 402, in Step 3, the database 412 will return a value that indicates that the HP-CPE 402 is a CPE. In Step 4, the SAS 410 records locally the fact that the HP-CPE 402 is a CPE, for example, by saving the unique device serial number for the HP-CPE 402 in a special list of registered CPE devices. Note that the database 412 may be any suitable database such as (without limitation) the FCC Device Certification Database or a local database implemented at the SAS 410.

In Step 5, the SAS 410 transmits a positive RegistrationResponse object to the HP-CPE 402 via the CBSD 404.

In Step 6, the HP-CPE 402 transmits a GrantRequest object to the SAS 410 via the CBSD 404. The GrantRequest object contains a request for bandwidth and a maximum EIRP level. Assuming that the CBSD 404 has already been authorized by the SAS 410 as the result of a previous CPAS process to transmit at that EIRP level within an equivalent unlicensed subband having the requested bandwidth, in Step 7, the SAS 410 will transmit a positive GrantResponse object to the HP-CPE 402 via the CBSD 404, which identifies the specific CBRS subband within which the HP-CPE 402 can transmit up to that EIRP level.

In Step 8, the HP-CPE 402 transmits its first HeartbeatRequest object to the SAS 410 via the CBSD 404. Among other information, the HeartbeatRequest object contains the unique device serial number for the HP-CPE 402. In Step 9, the SAS 410 uses the unique device serial number to determine that the HP-CPE 402 is listed in its locally stored list of registered CPE devices. As such, in Step 10, the SAS 410 transmits a positive HeartbeatResponse object back to the HP-CPE 402 via the CBSD 404, thereby authorizing the HP-CPE 402 to transmit within the allocated CBRS subband up to the specified maximum EIRP level. Note that, if the wireless device were not a CPE (e.g., a CBSD), then the SAS 410 would wait until the next CPAS process is performed before transmitting a positive HeartbeatResponse object to the wireless device.

As described, according to the method of FIG. 4, the SAS 410 is able to immediately authorize the HP-CPE 402 to transmit at a high power level above the CBRS EIRP threshold without relying on a corresponding CPAS process and therefore without the delay associated with such process.

FIG. 5 is a representation of a method for authorizing an HP-CPE 502 in a CBRS system 500, according to a second embodiment. As shown in FIG. 5, the method is represented by the following eight steps.

In Step 1, the HP-CPE 502 attaches to the CBSD 504 using the existing network access procedures as defined for the technology deployed.

In Step 2, the HP-CPE 502 transmits a RegistrationRequest object to the SAS 510 via the CBSD 504. In this embodiment, in addition to the RegistrationRequest object containing the FCC model number and the unique device serial number for the HP-CPE 502 among other information, the RegistrationRequest object also contains a field (e.g., a one-bit flag) that identifies the HP-CPE 502, for example, as either a CPE type device or a non-CPE type device. Since, in this example, the HP-CPE 502 is a CPE type device, the SAS 510 saves the unique device serial number for the HP-CPE 502 in its special list of registered CPE devices.

In Step 3, the SAS 510 transmits a positive RegistrationResponse object to the HP-CPE 502 via the CBSD 504.

Steps 4-8 of FIG. 5 are equivalent to Steps 6-10, respectively, of FIG. 4. In particular, in Step 4, the HP-CPE 502 transmits a GrantRequest object to the SAS 510 via the CBSD 504. The GrantRequest object contains a request for bandwidth and a maximum EIRP level. Assuming that the CBSD 504 has already been authorized by the SAS 510 as the result of a previous CPAS process to transmit at that EIRP level within an equivalent unlicensed subband having the requested bandwidth, in Step 5, the SAS 510 will transmit a positive GrantResponse object to the HP-CPE 502 via the CBSD 504, which identifies the specific CBRS subband within which the HP-CPE 502 can transmit up to that EIRP level.

In Step 6, the HP-CPE 502 transmits its first HeartbeatRequest object to the SAS 510 via the CBSD 504. Among other information, the HeartbeatRequest object contains the unique device serial number for the HP-CPE 502. In Step 7, the SAS 510 uses the unique device serial number to determine that the HP-CPE 502 is listed in its locally stored list of registered CPE devices. As such, in Step 8, the SAS 510 transmits a positive HeartbeatResponse object back to the HP-CPE 502 via the CBSD 504, thereby authorizing the HP-CPE 502 to transmit within the allocated CBRS subband up to the specified maximum EIRP level. Note that, if the wireless device were not a CPE (e.g., a CBSD), then the SAS 410 would wait until the next CPAS process is performed before transmitting a positive HeartbeatResponse object to the wireless device.

As described and similar to the first method of FIG. 4, according to the second method of FIG. 5, the SAS 510 is also able to immediately authorize the HP-CPE 502 to transmit at a high power level above the CBRS EIRP threshold without relying on a corresponding CPAS process and therefore without the delay associated with such process.

Certain embodiments are a CPE for a CBRS system. The CPE transmits a registration request to a SAS of the CBRS system via a CBSD of the CBRS system, wherein the registration request contains an FCC model number and a device serial number for the CPE, the registration request further contains a CPE device type identification for the CPE independent of the FCC model number and the device serial number, and the SAS approves the registration request. The CPE receives a positive registration response from the SAS via the CBSD and transmits a grant request to the SAS via the CBSD, wherein the SAS approves the grant request. The CPE receives a positive grant response from the SAS via the CBSD and transmits a heartbeat request to the SAS via the CBSD, wherein the SAS relies on the CPE device type identification to approve the heartbeat request without relying on a corresponding CPAS process. The CPE receives a positive heartbeat response from the SAS.

In at least some of the above embodiments, the CPE is an HP-CPE that is configured to transmit at a high EIRP level greater than a maximum EIRP level allowed by the CBRS system for CBRS end-user devices, and the CBSD is already authorized to transmit at the high EIRP level within an unlicensed CBRS subband.

Other embodiments are a SAS for a CBRS system. The SAS receives a registration request from a CPE of the CBRS system via a CBSD of the CBRS system, determines a CPE device type identification for the CPE, approves the registration request, transmits a positive registration response to the CPE via the CBSD, receives a grant request from the CPE via the CBSD, approves the grant request, transmits a positive grant response to the CPE via the CBSD, receives a heartbeat request from the CPE via the CBSD, relies on the CPE device type identification for the CPE to approve the heartbeat request without relying on a corresponding CPAS process, and transmits a positive heartbeat response to the CPE.

In at least some of the above embodiments, the CPE is an HP-CPE that transmits at a high EIRP level greater than a maximum EIRP level allowed by the CBRS system for CBRS end-user devices, and the CBSD is already authorized to transmit at the high EIRP level within an unlicensed CBRS subband.

In at least some of the above embodiments, the registration request contains an FCC model number and a device serial number for the CPE, and the registration request further contains the CPE device type identification for the CPE independent of the FCC model number and the device serial number.

In at least some of the above embodiments, the registration request contains an FCC model number and a device serial number for the CPE, and the SAS is configured to access a database using the FCC model number for the CPE to retrieve the CPE device type identification for the CPE.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A method for authorizing customer premises equipment (CPE) in a Citizens Broadband Radio Service (CBRS) system, the method comprising:
   (a) the CPE transmitting a registration request to a spectrum access system (SAS) of the CBRS system via a CBRS device (CBSD) of the CBRS system, wherein:
      the registration request contains a Federal Communications Commission (FCC) model number and a device serial number for the CPE; and
      the registration request further contains a CPE device type identification for the CPE independent of the FCC model number and the device serial number;
   (b) the CPE receiving a positive registration response from the SAS via the CBSD;
   (c) the CPE transmitting a grant request to the SAS via the CBSD;
   (d) the CPE receiving a positive grant response from the SAS via the CBSD;
   (e) the CPE transmitting a heartbeat request to the SAS via the CBSD, wherein the SAS relied on the CPE device type identification to approve the heartbeat request without relying on a corresponding Coordinated Periodic Activity among SASs (CPAS) process; and
   (f) the CPE receiving a positive heartbeat response from the SAS.

2. The method of claim 1, wherein:
   the CPE is a high-power CPE (HP-CPE) that transmits at a high effective isotropic radiated power (EIRP) level greater than a maximum EIRP level allowed by the CBRS system for CBRS end-user devices; and
   the CBSD is already authorized to transmit at the high EIRP level within an unlicensed CBRS subband.

3. A CPE for a CBRS system, wherein the CPE comprises a processor and a memory comprising program code configured to, when executed by the processor, cause the CPE to:
   transmit a registration request to a SAS of the CBRS system via a CBSD of the CBRS system, wherein:
      the registration request contains an FCC model number and a device serial number for the CPE; and
      the registration request further contains a CPE device type identification for the CPE independent of the FCC model number and the device serial number;
   receive a positive registration response from the SAS via the CBSD;
   transmit a grant request to the SAS via the CBSD;
   receive a positive grant response from the SAS via the CBSD;
   transmit a heartbeat request to the SAS via the CBSD, wherein the SAS relied on the CPE device type identification to approve the heartbeat request without relying on a corresponding CPAS process; and
   receive a positive heartbeat response from the SAS.

4. The CPE of claim 3, wherein:
   the CPE is an HP-CPE that is configured to transmit at a high EIRP level greater than a maximum EIRP level allowed by the CBRS system for CBRS end-user devices; and
   the CBSD is already authorized to transmit at the high EIRP level within an unlicensed CBRS subband.

5. A method for authorizing a CPE in a CBRS system, the method comprising:
   (a) a SAS of the CBRS system receiving a registration request from the CPE via a CBSD of the CBRS system;
   (b) the SAS determining a CPE device type identification for the CPE;
   (c) the SAS approving the registration request;
   (d) the SAS transmitting a positive registration response to the CPE via the CBSD;
   (e) the SAS receiving a grant request from the CPE via the CBSD;
   (f) the SAS approving the grant request;
   (g) the SAS transmitting a positive grant response to the CPE via the CBSD;
   (h) the SAS receiving a heartbeat request from the CPE via the CBSD;
   (i) the SAS relying on the CPE device type identification for the CPE to approve the heartbeat request without relying on a corresponding CPAS process; and
   (j) the SAS transmitting a positive heartbeat response to the CPE.

6. The method of claim 5, wherein:
   the CPE is an HP-CPE configured to transmit at a high EIRP level greater than a maximum EIRP level allowed by the CBRS system for CBRS end-user devices; and
   the CBSD is already authorized to transmit at the high EIRP level within an unlicensed CBRS subband.

7. The method of claim 5, wherein:
   the registration request contains an FCC model number and a device serial number for the CPE; and
   the registration request further contains the CPE device type identification for the CPE independent of the FCC model number and the device serial number.

8. The method of claim 5, wherein:
   the registration request contains an FCC model number and a device serial number for the CPE; and the SAS accesses a database using the FCC model number for the CPE to retrieve the CPE device type identification for the CPE.

9. A SAS for a CBRS system, wherein the SAS comprises a processor and a memory comprising program code configured to, when executed by the processor, cause the SAS to:
- receive a registration request from a CPE of the CBRS system via a CBSD of the CBRS system;
- determine a CPE device type identification for the CPE;
- approve the registration request;
- transmit a positive registration response to the CPE via the CBSD;
- receive a grant request from the CPE via the CBSD;
- approve the grant request;
- transmit a positive grant response to the CPE via the CBSD;
- receive a heartbeat request from the CPE via the CBSD;
- rely on the CPE device type identification for the CPE to approve the heartbeat request without relying on a corresponding CPAS process; and
- transmit a positive heartbeat response to the CPE.

10. The SAS of claim 9, wherein:
- the CPE is an HP-CPE that is configured to transmit at a high EIRP level greater than a maximum EIRP level allowed by the CBRS system for CBRS end-user devices; and
- the CBSD is already authorized to transmit at the high EIRP level within an unlicensed CBRS subband.

11. The SAS of claim 9, wherein:
- the registration request contains an FCC model number and a device serial number for the CPE; and
- the registration request further contains the CPE device type identification for the CPE independent of the FCC model number and the device serial number.

12. The SAS of claim 9, wherein:
- the registration request contains an FCC model number and a device serial number for the CPE; and
- the SAS is configured to access a database using the FCC model number for the CPE to retrieve the CPE device type identification for the CPE.

* * * * *